Figure 1:
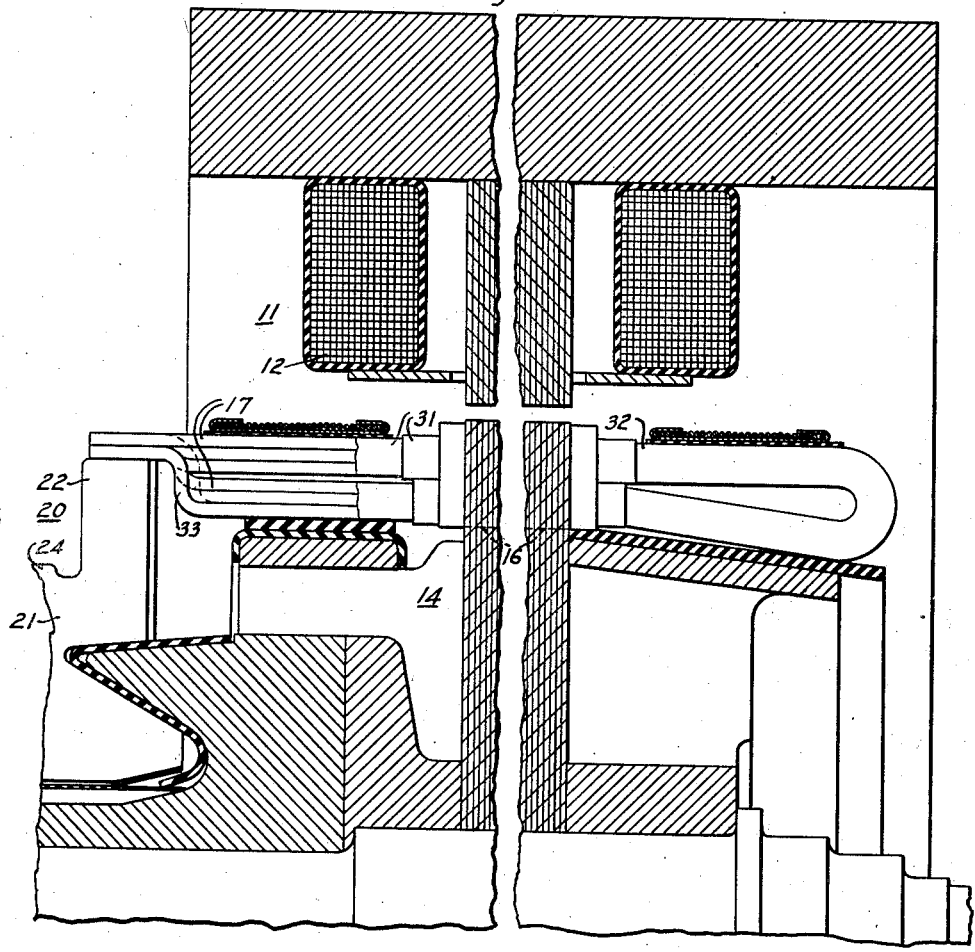

May 28, 1946.   G. L. MOSES ET AL   2,401,011
DYNAMO-ELECTRIC MACHINE
Filed Nov. 1, 1944

WITNESSES:

INVENTORS
Clarence A. Atwell
and Graham L. Moses.
BY
ATTORNEY

Patented May 28, 1946

2,401,011

UNITED STATES PATENT OFFICE 2,401,011

DYNAMOELECTRIC MACHINE

Graham L. Moses, Edgewood, and Clarence A. Atwell, Wilkinsburg, Pa., assignors to Westinghouse Electric Corporation, East Pittsburgh, Pa., a corporation of Pennsylvania Application November 1, 1944, Serial No. 561,370

1 Claim. (Cl. 171—252)

Our invention relates to an improved commutator and armature-winding construction for direct-current motors and generators.

Much work has been done, in recent years, in reducing the size and the weight of direct-current motors and generators by increasing their speeds and their operating-temperatures, and by other expedients. A point has been reached, where the size of the commutator imposes a physical limit, preventing any further reductions in the diameter of the armature or rotor-member of the machine, even though the diameter of the armature-punchings is only slightly more than the diameter of the commutator.

This is particularly true in traction motors, or in motors and generators for transit equipment, where the high voltages usually require a design having a large number of commutator-bars, single-turn armature-coils, and as many commutator-bars as there are coils, so that only a single turn of the commutator-winding is disposed between adjacent commutator-bars, thus reducing the voltage between adjacent commutator bars to a minimum. The armature-winding coils or turns are usually arranged with six or more coil-sides in each slot of the armature-core. Since the commutator is to have the smallest possible diameter, this means that the bars must be very narrow. The problem of attaching the armature-winding leads to the commutator necks or risers thus becomes a serious problem, from both a mechanical and an electrical point of view.

Heretofore, the necks or risers of commutator-bars have been slotted, in accordance with a long-established practice, and the armature-coils have been made with strap-conductors which lie edgewise in the slots, that is, with the flat part vertical or radial, so that the flat coil-ends may be secured within the vertical or radial slots in the commutator-risers. As the physical size of the commutator has been reduced more and more, for a given rating of the machine, as improvements have been made in the interests of reducing the weight and the size, a practical physical limit has been reached, because of this problem of connecting the coil-leads to the commutators, on transit apparatus where the commutator consists of a large number of very narrow commutator-bars, and still thinner armature-conductors.

Moreover, these slotted commutator-necks of the prior art have required a soldered joint for the armature-leads, because no practical method has been known for getting sufficient heat down into the slot of the neck, in a compact assembly, to produce a brazed joint. At the same time, improved non-combustible insulating materials have permitted material increases in the armature-temperatures, so that the soldered joints between the armature-coils and the slotted necks have become the points of first failure under overload-conditions.

The primary object of our invention is to provide a design in which these limits may be avoided.

A more specific object of our invention is to provide an accessible assembly, in which the armature-coil leads are brought out to the flat tops of the commutator-necks, which are sufficiently accessible to permit the application of pressure, and to permit heating by current-conduction or flame, to a temperature high enough to produce a brazed joint, which will stand temperatures far above the melting-point of solder.

Figure 2:
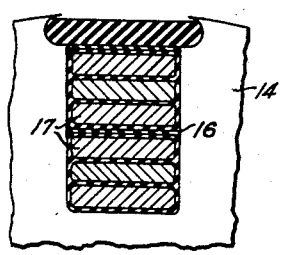
Figure 3:
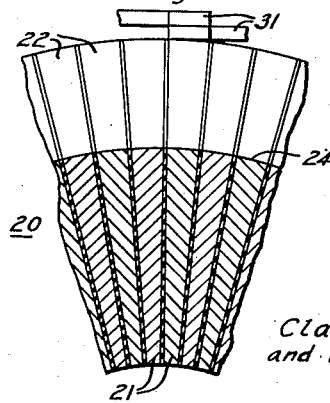

More particularly, it is an object of our invention to provide a commutator-type dynamoelectric machine in which the armature-coil conductors are composed of strap-conductors of rectangular cross-section, arranged flatwise in the armature-slots, in conjunction with commutator-bars having solid or unslotted necks or risers, with the armature-coil leads brazed, or otherwise secured, to the tops of the necks, as illustrated in the accompanying drawing, wherein Figure 1 is a fragmentary longitudinal sectional view of a direct-current traction-motor illustrating an application of our invention, Fig. 2 is a detail-view of one of the armature-slots, and Fig. 3 is a fragmentary transverse-sectional view of the commutator, showing the commutator-necks in elevation, and illustrating the manner of connecting the two armature-coil conductors to the top of one of the commutator-necks or risers.

In the application of our invention which is shown in the drawing, a high-speed light-weight direct-current motor or generator is shown, designed for use in transit equipment, where size and weight are at a premium. The stator or field-member comprises a large number of poles 11, having field-coils 12 thereon. The rotor-member comprises an armature-core 14 which is disposed inside of the field-member. The armature-core is slotted, as indicated at 16, to receive a plurality of flat armature-coil conductors 17, arranged flatwise in each slot. One end of the rotor-member carries a commutator-member 20, composed of a large number of narrow commutator-bars 21, insulated from each other, each bar having a solid riser or neck 22 at the end closest to the armature-core. The assembly of commutator-bars 21, which constitutes the commutator 20, provides a cylindrical commutator-surface 24 of the machine.

In the particular machine illustrated, the armature-winding is disposed in two layers, in the armature-slots 16. There are three conductors or coil-sides 17 in the top layer, and three in the bottom layer. These conductors or coil-sides 17 are made of strap-conductors, of rectangular cross-section, lying with their flat sides horizontal or tangential. The tops of the commutator necks 22 lie at about the same plane, or radius with respect to the motor-axis, as the top conductors or coil-sides 17 of the six conductors which lie in each of the armature-slots 16.

The armature-winding is arranged with front and rear end-winding portions 31 and 32, providing the usual diamond-shaped coil-construction, and the ends of the front end-windings 31 are brought out to the commutator necks 22. The top conductors, which are at about the same height as the tops of the commutator-necks, come out without any substantial vertical or radial bend, so as to overlie the substantially flat connecting-surfaces at the tops of the necks to which they are to be attached, each neck being attached to the coil-ends of two successive armature-coils. The other coil-sides, which are disposed at levels below the tops of the commutator-necks, have vertical bends therein, near their ends, as indicated at 33 in Fig. 1, to bring them to the tops of the commutator-necks to which they are connected. Each commutator-neck thus has two flat armature-coil terminals lying, one over the other, on top of the neck. These terminals are suitably electrically and mechanically connected to the flat tops of the necks, preferably by brazing, or by welding or any other suitable connecting-means.

By our invention, we have removed limiting mechanical design-considerations, which have heretofore prevented taking full advantage of recent developments in the art, in the direction of reducing the size and weight of direct-current dynamo-electric machines, particularly the smaller and intermediate sizes. We have made it possible to reduce the sizes of the commutator necks and the armature-coil connections thereto, thus making possible the realization of the maximum permissible reductions in diameter which can be obtained by resorting to higher speeds and higher temperatures.

We claim as our invention:

A dynamo-electric machine having a slotted armature-core having an armature-winding thereon, and a commutator associated therewith, characterized by said armature-winding having at least three strap-conductors lying flatwise, one above the other, in the slots of the core, and said commutator comprising a plurality of bars, each having a solid neck, there being a single turn of the armature-winding between adjacent bars of the commutator, and means for securing the ends of two of said strap-conductors flatwise at the top of each neck, the tops of the commutator-necks lying at about the same radial height as the top conductors of the several slots of the armature-core, and the conductors other than the top conductors being bent radially outwardly, near their ends, so as to overlie the tops of the commutator-necks to which they are secured.

GRAHAM L. MOSES.
CLARENCE A. ATWELL.